(12) United States Patent
Jacobs et al.

(10) Patent No.: US 6,753,114 B2
(45) Date of Patent: *Jun. 22, 2004

(54) COMPOSITE ELECTROLYTE FOR A RECHARGEABLE LITHIUM BATTERY

(75) Inventors: James K. Jacobs, Toronto (CA); Sankar Dasgupta, Toronto (CA)

(73) Assignee: Electrovaya Inc., Mississauga (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/104,277

(22) Filed: Jun. 25, 1998

(65) Prior Publication Data

US 2001/0038948 A1 Nov. 8, 2001

Related U.S. Application Data

(60) Provisional application No. 60/082,341, filed on Apr. 20, 1998.

(51) Int. Cl.⁷ .............................................. H01M 10/40
(52) U.S. Cl. ........................ 429/316; 429/304; 429/317
(58) Field of Search ................................ 429/316, 317, 429/304, 306

(56) References Cited

U.S. PATENT DOCUMENTS

| | | | |
|---|---|---|---|
| 4,650,730 A | 3/1987 | Lundquist et al. | ............ 429/62 |
| 4,731,304 A | 3/1988 | Lundquist et al. | ............ 429/62 |
| 5,449,576 A | 9/1995 | Anani | ......................... 429/191 |
| 5,456,000 A | 10/1995 | Gozdz et al. | ............... 29/623.2 |
| 5,620,811 A | 4/1997 | Zhang et al. | ............... 429/192 |
| 5,643,695 A | 7/1997 | Barker et al. | ............... 429/197 |
| 5,658,685 A | 8/1997 | Oliver | ......................... 429/190 |
| 5,681,357 A | 10/1997 | Eschbach et al. | ........... 29/623.3 |
| 5,688,293 A | 11/1997 | Oliver et al. | ............... 29/623.1 |
| 5,716,421 A | 2/1998 | Pendalwar et al. | ......... 29/623.2 |
| 5,837,015 A | 11/1998 | Venugopal et al. | |
| 5,853,916 A | 12/1998 | Venugopal et al. | |
| 5,856,039 A | 1/1999 | Takahashi | |
| 5,952,120 A | 9/1999 | Yu et al. | |
| 6,635,384 B2 * | 10/2003 | Bahar et al. | ................. 429/188 |

FOREIGN PATENT DOCUMENTS

| | | | |
|---|---|---|---|
| EP | 0651455 | 3/1995 | .......... H01M/10/40 |
| EP | 0798791 | 1/1997 | ............ H01M/2/00 |
| WO | 9828812 | 2/1998 | .......... H01M/10/40 |

* cited by examiner

Primary Examiner—John S. Maples
(74) Attorney, Agent, or Firm—Bereskin & Parr

(57) ABSTRACT

The composite electrolyte for use in a thin plate rechargeable lithium battery comprises a porous or microporous inert polymer separator laminate which carries another porous polymer containing a dissociable lithium compound, and the adherent polymer layers are impregnated with an organic liquid containing a lithium salt. The porous or microporous separator laminate may be a single polymer layer or a multiple polymer layer. The composite electrolyte is inserted between the electrodes of a rechargeable lithium battery. In another embodiment the porous polymer separator sheet has an adherent dissociable lithium compound containing polymer layer on each of its major faces.

13 Claims, 1 Drawing Sheet

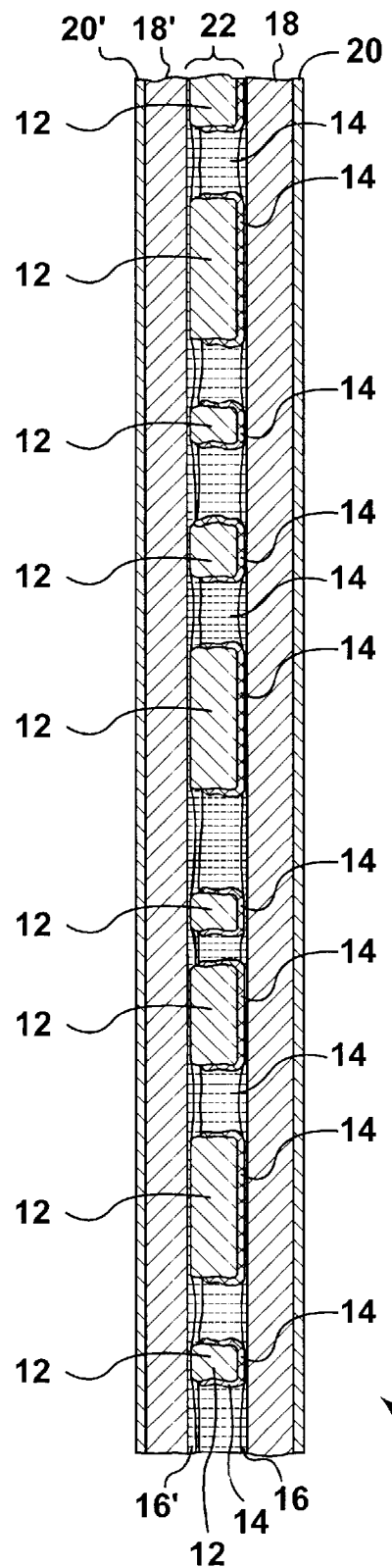
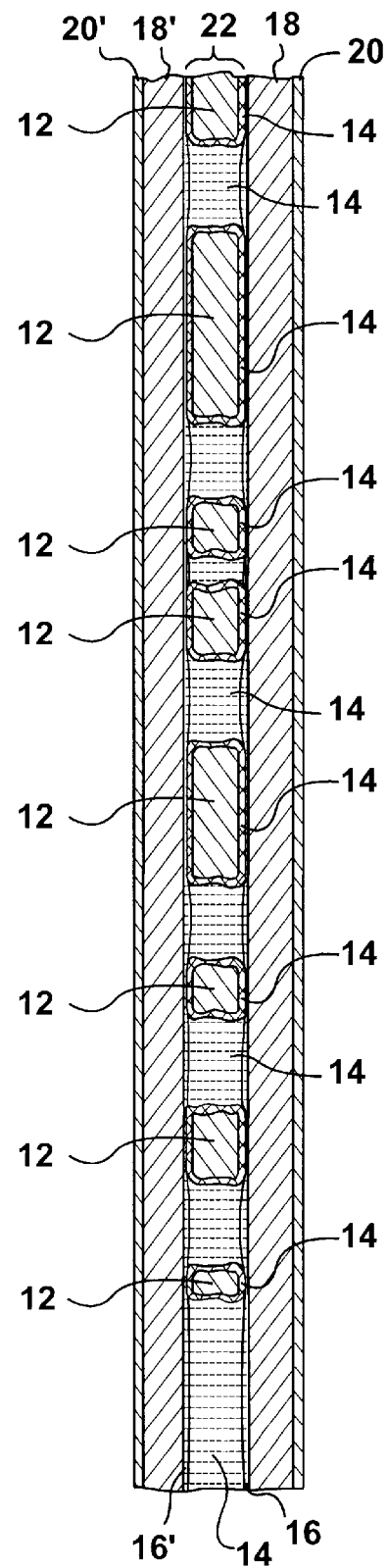
FIG. 1a　　　FIG. 1b

COMPOSITE ELECTROLYTE FOR A RECHARGEABLE LITHIUM BATTERY

This application claims the benefit of U.S. Provisional Application No.: 60/082,341, filed Apr. 20, 1998.

FIELD OF INVENTION

This invention is related to the field of electrochemical cells or electrochemical batteries, more particularly to rechargeable lithium batteries.

BACKGROUND OF THE INVENTION

Most electrochemical cells include a negative electrode, a positive electrode and an electrolyte providing passage for the ionic electroactive species of the electrochemical cell. Electrolytes may be solid or liquid or a composite of both. The electrodes are usually prevented from coming into direct contact by some form of a separator or solid electrolyte, which allows the movement of ionic electroactive species but not of electrons. Electrochemical cells or batteries are usually equipped with current collectors which can be connected to an external electrical circuit for utilizing the electrical energy generated by the battery. In case of rechargeable electrochemical cells or batteries, the same current collectors serve in recharging the battery or cell.

In the last decade or more lithium batteries have been developed for generating electrical energy. Rechargeable lithium batteries may be cylindrical or button shaped and in such formats they often have a non-aqueous liquid electrolyte. More recently, thin plate rechargeable lithium batteries have been developed which are suitable for use in electronic devices of current design, as well as having high energy density per volume or weight. Rechargeable thin plate lithium cells or batteries most often utilize as the anode active substance, lithium foil or lithium alloy, or a substance capable of reversibly intercalating lithium ions. The cathode of a rechargeable lithium battery usually contains a transition metal chalcogenide or equivalent, as the positive active material. The electrolyte of a thin plate rechargeable lithium battery may be a solid electrolyte laminate containing lithium ions, or a separator sheet in which a non-aqueous solution containing the electroactive component, that is a compound bearing a dissociable lithium ion, is dispersed. Separators for lithium batteries are frequently formed of inert porous or microporous polymer layers or sheets, which are subsequently impregnated with a liquid electrolyte containing a dissolved lithium salt or similar substance. The polymer sheet either as a solid electrolyte or as host for a liquid electrolyte, needs to be durable and strong to render effective barrier between the electrodes, as well as to be able to supply sufficiently high concentration of mobile electroactive species per unit area for yielding high current density. It can be seen that the development of suitable electrolytes is a very important aspect of thin film rechargeable lithium battery technology.

Conventional solid polymer electrolyte compositions incorporate dissociable lithium ion bearing compounds in their structure. The mobility of the electroactive species in the polymer matrix will depend on the nature of the lithium compound having labile lithium ions, as well as on the temperature of the lithium battery operation and such like. It is noted that the mechanical strength of polymers capable of incorporating dissociable lithium ion bearing compounds is often low and may also be subject to degradation by the electrode materials if the temperature of the battery rises above normal operating temperatures. The lack of mechanical strength may require that solid polymer electrolytes have substantial thickness, which may lead to diminished energy density per unit volume for lithium batteries. The ionic resistance of lithium ion conducting solid polymer electrolytes are usually in the range of $10^{-4}$ to $10^{-2}$ S/cm.

Hybrid electrolytes for thin plate rechargeable lithium batteries often utilize organic solvents or mixtures thereof for the dissolution of a lithium compound. There are known solvents or mixtures of solvent compounds, such as disclosed, for example, in U.S. Pat. No. 5,643,695 issued to Barker et al. on Jul. 1, 1997. As briefly referred to above, an hybrid lithium battery electrolyte has an inert porous separator layer for keeping the electrodes separated and to hold in its pores and micropores a large reservoir of dissociable lithium ions for enabling the lithium battery to generate high current density. The lithium battery may be assembled of a negative electrode layer, a positive electrode layer and an inert plasticised separator layer between the electrodes. The plasticizer may be, at least in part, replaced by an organic lithium ion solution before packaging the battery, as is described in U.S. Pat. No. 5,456,000, issued to Gozdz et al. on Oct. 10, 1995. Inert polymer separators composed of multiple layers of polyolefin membranes of different porosity and melting point, are described in U.S. Pat. No. 4,650,730, issued to Lundquist et al. on Mar. 17, 1987. It is noted that most known separator sheets are inert, in other words, only the electroactive components of the organic solution retained in the cavities of the separator layer take part in the cell reaction. High pore density of the separator sheet may provide a high population of electroactive species but it may also undermine the mechanical strength, and hence the durability of the hybrid electrolyte.

More recently composite hybrid electrolytes for use in rechargeable lithium batteries have been described, wherein the separator is impregnated and/or coated with an inert gel of organic, polymerizable composition. Such multi-layered polymer systems are described in U.S. Pat. Nos. 5,681,357, 5,688,293 and 5,716,421, issued to Eschbach et al., Oliver et al. and Pendalwar et al, on Oct. 28, 1997, Nov. 18, 1997 and Feb. 10, 1998, respectively. In the multi-layered polymer systems for use in lithium batteries the inert porous polymer separator is a polyolefin layer and the polymerizable gel is polyvinylidene fluoride (PVDF) or chemically equivalent polymer or copolymer. The gelling compound as described in the above publications, is supported by the porous polyolefin layer, and is intended to serve as an inert absorbent for the lithium ion containing organic solutions which is added subsequently. In the methods taught by Eschbach et al., Oliver et al. and Pendalwar et al. the gelling compound is cured and polymerized in the packaged and sealed battery by subjecting the package to heat and pressure, thus also bonding the electrodes to the composite separator. The heat and pressure treatment which is required to solidify the gelling compound of the lithium batteries made according to the above methods, may damage the packaging of the lithium battery so produced, thereby rendering the packaging more vulnerable to moisture and similar atmospheric damage. Moreover, the curing of the battery components subsequent to packaging and sealing may generate undesirable gases and similar compounds detrimental to the satisfactory operation of the lithium battery. It is also noted, that in the multi-component polymer electrolyte systems containing gelling compounds, there is only one kind of electroactive species present, which is added to the multi-component electrolyte subsequent to assembling the the electrochemical cell.

There is a need for an electrolyte system for use in thin plate rechargeable lithium batteries which provides enhanced mechanical integrity and strength, as well as capability of high ionic conductivity without unwarranted increase in the thickness of the electrolyte layer.

SUMMARY OF THE INVENTION

A new composite electrolyte has been found for use in thin plate rechargeable lithium batteries, comprising an inert porous or microporous first polymer laminate layer carrying a microporous or porous layer or coating of a second polymer on at least one of its major faces. The second polymer layer is containing a dissociable lithium compound and the at least two polymeric layers are forming a composite structure. A portion of the pores or micropores of the first polymer layer is filled with the second lithium compound bearing polymer in the composite structure. The composite porous structure is subsequently impregnated with a lithium salt bearing non-aqueous organic liquid.

The composite electrolyte is placed between the negative and positive electrodes of a rechargeable lithium battery, thereby forming a thin plate rechargeable lithium battery which can be packaged with appropriate current collectors.

BRIEF DESCRIPTION OF THE DRAWINGS

FIGS. 1A and 1B are schematic representations on an enlarged scale of the cross-section of the lithium battery having composite electrolyte of the present invention.

The preferred embodiments of the invention will be described below, illustrated with working examples.

DETAILED DESCRIPTION OF THE PREFERRED EMBODIMENTS

The current density that a rechargeable lithium battery can generate in operation depends in a large measure, on the mobility of the electroactive species in the electrolyte, and on the concentration of dissociable lithium ions per unit area in the electrolyte. The mobility of lithium ions in an organic solution is usually higher at a given temperature, than the mobility of lithium ions dissolved or contained in a solid substance. Thin plate rechargeable lithium batteries are frequently packaged in a flexible polymer wrapping which may have minor sealing problems or may be slightly damaged in transit, and hence may inadvertently loose some of the lithium containing fluid. Hence it is usual that the amount of lithium containing organic solution is restricted to the amount the separator laminate can readily hold in its pores, cavities and as an adsorbed layer on its surface. It is customary in conventional lithium batteries to utilize a porous or microporous separator laminate in thickness of 20–70 $\mu$m to retain in its pores sufficient amount of dissolved electroactive species, as well as to provide mechanical strength. The total concentration of dissociable lithium ions per unit area may be higher in a solid polymer electrolyte laminate containing lithium, in comparison with the amount of lithium ions in the organic solution the separator laminate is capable of retaining, however, solid polymer electrolytes laminates are frequently low in mechanical strength, and as discussed above, need to have a notable thickness for durably separating the battery electrodes from one another, thereby increasing the ionic resistance of the electrolyte layer. It has now been found that the amount of dissociable lithium ions in the electrolyte layer can be increased without increasing the thickness of the electrolyte, and at the same time providing desirable mechanical strength and integrity by combining a porous or microporous separator laminate with a dissociable lithium ion containing polymer layer or coating on at least one face of the polymer separator laminate, and subsequently impregnating the composite electrolyte layer with an organic solution containing a lithium salt.

The polymer coating or layer can be deposited on one or on both major faces of the porous polymer separator laminate layer. The porous or microporous polymer separator laminate may be a polyalkane-type substance, such as polyethylene, polypropylene, a blended mixture of polyalkanes or similar inert organic polymers, frequently utilized in conventional rechargeable lithium batteries. The expression 'separator laminate' is understood to describe a sheetlike, inert, i.e. chemically non-interacting with the lithium battery components, relatively thin substance, having pores or channels which allow a liquid or semi-liquid to connect opposing faces of the separator laminate with one another. The porous or microporous polymer separator laminate may also be multi-layered. The separator laminate is coated by known methods with another porous organic polymer layer, containing a compound which has a dissociable lithium ion. Such organic polymers are often referred to as solid polymer electrolytes. The deposited coating is not only adhering to the surface but may partially penetrate some of the pores of the separator, it is however noted, that the inert separator laminate having the porous lithium ion containing polymer coating or layer on one or both of its faces, retains sufficient porosity for subsequent impregnation with the lithium salt containing organic liquid. The deposited porous polymer layer may be composed of polyethylene oxide, polypropylene oxide, polyvinylidene fluoride or poly-methyl methacrylate, and the lithium compound dissolved in the polymer may be, lithium triflate (LiCF$_3$SO$_3$), lithium borohexafluoride (LiBF$_6$), lithium phosphohexafluoride (LiPF$_6$), lithium arsenofluoride (LiAsF$_6$), lithium perchlorate (LiClO$_4$) or any known lithium compound which is soluble in the deposited polymer, and contains a lithium ion which is capable of dissociating.

The dissociable lithium compound containing porous polymer coating or layer may be obtained, for example, by depositing a polymer suspension on the face of the porous separator laminate and removing the medium in which the lithium compound containing polymer has been suspended. Other methods for obtaining a lithium ion containing porous polymer coating include electrophoresis, vapour deposition, immersion of the separator sheet in an emulsion of a lithium compound containing polymer and another non-aqueous liquid having a relatively low boiling point. The emulsifying component can be removed by drying or evacuation. The emulsion or suspension may also be extruded or sprayed onto the surface of the porous or microporous separator laminate. Any conventional method for obtaining a porous polymer layer adherent to the porous separator laminate may be used.

The porous inert polymer separator laminate with an adhering porous lithium ion containing polymer layer is subsequently impregnated with an organic liquid in which a lithium salt has been dissolved. The lithium salt in the adherent porous polymer layer may be different from the lithium salt dissolved in the organic liquid, however, the lithium compounds may also be similar. Any lithium salt that is soluble in the organic liquid conventionally utilized in impregnating porous polymer laminates, may be used, such as for example, lithium perchlorate, lithium phosphohexafluoride, lithium borohexafluoride, lithium triflate, lithium arsenofluoride and chemical equivalents. The organic liquid for dissolving the lithium salt may be ethylene carbonate, propylene carbonate, di-methyl carbonate, ethyl-methyl carbonate and similar conventional non-aqueous solvent-type substances capable of dissolving dissociable lithium containing compounds. The organic solvent may be a mixture of any of the above listed substances.

The three-component composite electrolyte is subsequently inserted between positive and negative electrodes of a lithium battery. Such electrodes usually contain lithium electrode active materials capable of reversibly intercalating lithium ions, or may also include a lithium or a lithium alloy foil. One face of each of the battery electrodes is usually in contact with a positive and negative current collector, respectively. The cross-section of the assembled lithium battery or cell is schematically shown on FIG. 1a, where 10 represents the battery, 12 is the porous separator laminate, and 14 is the deposited porous layer of dissociable lithium compound containing polymer adhering to the separator laminate. The double layer structure, 12 and 14, is impregnated with a lithium salt containing organic liquid, filling the pores and micropores, as well as forming thin films on the surfaces of the combined layer structure, indicated by reference numerals 16 and 16'. The composite electrolyte is shown by reference numeral 22. 18 and 18' represent the lithium battery electrode layers, and 20 and 20' are the respective current collectors. The assembled lithium battery is subsequently packaged in flexible polymer sheets and sealed in the usual manner to protect the lithium battery from mechanical damage and atmospheric corrosion.

FIG. 1b shows another embodiment, wherein each face of the porous separator laminate 12, carries a porous layer of dissociable lithium compound containing polymer, 14 and 14'. Like numerals represent like elements of FIG. 1a.

In FIGS. 1a, 1b, layers 14, 14' are shown with small circles to indicate, very schematically, that these layers of dissociable lithium compound containing polymer are porous. FIGS. 2A, 2B show alternative views where transverse pores in the separator laminate 12 are shown schematically and the porous layers 14, 14' are shown as coated on the porous separator laminate 12.

In yet another embodiment the composite structure made of the porous separator laminate and the adherent, dissociable lithium compound containing porous polymer layers, is first placed between the positive and negative electrodes of the rechargeable lithium cell, and the separator laminate with the adherent porous lithium compound containing solid polymer electrolyte are subsequently impregnated with the lithium salt containing organic solution in the usual manner. The lithium battery so obtained is then packaged and sealed. Thus the composite polymer layers of the present invention may be impregnated with the lithium ion containing organic solution either prior to assembling the lithium cell or subsequent to bringing the electrodes in contact with the composite electrolyte structure, but at any rate, prior to packaging and sealing the battery.

EXAMPLE 1

A rechargeable lithium battery was assembled having positive electrode layer made of lithium-cobalt oxide of 20 $\mu$m particle size, mixed with 5 wt. % acetylene black and 5 wt. % polyvinylidene fluoride (PVDF) as binder. The negative electrode layer of the lithium battery was made of graphite of 15 $\mu$m particle size, mixed with 5 wt. % PVDF binder. The electrolyte consisted of a microporous polyethylene and polypropylene multi-layered polymer laminate marketed under the name of "Celgard 2300", which has been dipped in a suspension of submicroscopic polyethylene oxide particles containing lithium phosphohexafluoride (LiPF$_6$) in the range of 5–8 wt. %. The polyethylene oxide was suspended in a 1:1 mixture of acetone and n-methyl pyrrolidone (NMP), and the resulting suspension contained 30 wt. % solids. The suspension coating on the polymer laminate was allowed to dry. The dried polyethylene oxide layer filled 15% of the pores of the "Celgard 2300" layer. The obtained composite polymer layer structure was placed between the LiCoO$_2$ positive electrode and the graphite negative electrode and subsequently impregnated with an ethylene carbonate—di-methyl carbonate solution containing LiPF$_6$ in 1 mole concentration. The obtained lithium battery was packaged and sealed. The active surface area of the lithium battery was 600 cm$^2$.

The lithium battery was cycled between 4.2 volt and 3.0 volt, charging at 400 mA and discharging at 400 mA. The voltage drop of the lithium battery at 400 mA current was measured to be 40 mV, which yielding a value of calculated electrolyte resistance of 60 ohm.cm. The capacity of the lithium battery was 3200 mA/h which was found to diminish slightly after 50 cycling.

EXAMPLE 2

A lithium battery was made up of positive and negative electrodes as described in Example 1. The electrolyte was constructed of microporous polypropylene layer marketed under the name of "Celgard 2500". The polypropylene layer was dipped in an organic liquid containing 1 wt. % of PVDF submicroscopic particles in a 1:1 mixture of acetone and NMP. The polypropylene was withdrawn from the suspension and the solvent was allowed to evaporate to yield a continuous coating. The PVDF contained 8–10 wt. % LiPF$_6$. The dipping of the "Celgard 2500" was repeated 6 times, thereby building up a layer of PVDF containing LiPF$_6$. About 35% of the pores of the "Celgard 2500" were penetrated by the LiPF$_6$ containing PVDF layer. The obtained composite polymeric structure was placed between the LiCoO$_2$ positive electrode and the graphite negative electrode and subsequently impregnated with an ethylene carbonate—methyl-ethyl carbonate solution containing LiPF$_6$ in 1 mole concentration. The obtained lithium battery was packaged and sealed. The active surface area of the lithium battery was 600 cm$^2$.

The lithium battery was cycled between 4.2 V and 2.75 V, charging at 400 mA and discharging at 400 mA. The voltage drop of the lithium battery at 400 mA current was measured to be 63 mV, thus the electrolyte resistance was calculated to be 94.5 ohm.cm. The capacity of the lithium battery was 3150 mA/h which was found to diminish slightly after 60 cycling.

EXAMPLE 3

A lithium battery was made up of positive and negative electrodes as described in Example 1, however, the binder utilized in the electrodes of the lithium battery was 5 wt. % PTFE. The electrolyte was constructed of microporous polypropylene layer marketed under the name of "Celgard 2500". The polypropylene layer was coated by the doctor's blade method on both sides, in turn, with a suspension of submicroscopic PTFE in an organic liquid comprising a 1:1 mixture of acetone and NMP. The PTFE contained 6 wt. % LiPF$_6$. The solid content of the suspension was 20 wt. %. The PTFE coating was subsequently dried. It was found that 20% of the pores of the "Celgard 2500" was penetrated by the LiPF$_6$ containing PTFE layer. The polymer structure was impregnated with an ethylene carbonate—methyl-ethyl carbonate solution containing LiPF$_6$ in 1 mole concentration, and subsequently placed between a LiCoO$_2$ positive electrode and a graphite negative electrode made as described in Example 1. The obtained lithium battery was packaged and sealed. The active surface area of the lithium battery was 600 cm$^2$.

The lithium battery was cycled between 4.2 V and 2.95 V, charging at 400 mA and discharging at 400 mA. The voltage drop of the lithium battery at 400 mA current was 55 mV, which gave a calculated electrolyte resistance of 82.5 ohm.cm. The capacity of the lithium battery was 3180 mA/h, which value was found to diminish slightly after 50 cycling.

The lithium salt in the above described lithium batteries assembled in accordance with the present invention was lithium phosphohexafluoride, but other lithium compounds, such as lithium perchlorate, lithium arsenofluoride, lithium triflate, lithium borohexafluoride or other lithium salts soluble in organic substances could equally well have been used.

The particular advantages of the composite electrolyte of the present invention include that the dissociable lithium compound containing solid polymer layers utilized may be thinner than that required for mechanical strength if it were used by itself. Another advantage is that the porous or microporous, inert separator laminate not only provides support for the solid polymer electrolyte layer but also carries a lithium ion containing solution in its pores and is wetted by the solution on its surface, thereby increasing the number of lithium ions available for ionic conduction in the lithium battery. Thus the current the lithium battery is capable of providing may be substantially enhanced without significant increase in the thickness of the electrolyte layer and with improved mechanical strength. Moreover, the total amount of dissociable lithium ions available in the composite electrolyte can be increased without increase in the volume of the lithium compound containing liquid present in the lithium battery package.

Although the present invention has been described with reference to the preferred embodiment, it is to be understood that modifications and variations may be resorted to without departing from the spirit and scope of the invention, as those skilled in the art will readily understand. Such modification and variations are considered to be within the purview and scope of the invention and the appended claims.

We claim:

1. A composite electrolyte for a rechargeable lithium battery comprising:
    an inert first laminate layer of a first polymer, having a multiplicity of pores including walls and two major faces, and having an adherent, porous, solid, second layer of a second polymer deposited on at least one of said major faces, said adherent, porous, solid, second polymer layer containing a first lithium compound having dissociable lithium ions, wherein said adherent, porous, solid, second polymer layer partially fills one portion of said multiplicity of pores of said inert first laminate layer, thereby providing a composite polymer structure of at least two polymer layers having a second portion of said pores unfilled, and wherein said unfilled second portion of said pores of said composite polymer structure is impregnated with an organic liquid containing a second lithium compound having dissociable lithium ions.

2. A composite electrolyte for a rechargeable lithium battery as claimed in claim 1, wherein said first polymer is selected from the group consisting of polyethylene, polypropylene and a blended mixture of polyalkenes.

3. A composite electrolyte for a rechargeable lithium battery as claimed in claim 2, wherein said inert first laminate layer of a first polymer is comprised of a single layer or multiple layers of said first polymer.

4. A composite electrolyte for a rechargeable lithium battery as claimed in claim 1, wherein said second polymer is selected from the group consisting of polyethylene oxide, polytetrafluoroethylene (PTFE), and polyvinylidene fluoride.

5. A composite electrolyte for a rechargeable lithium battery as claimed in claim 1, wherein said first lithium compound having dissociable lithium ions is selected from the group consisting of lithium triflate, lithium borohexafluoride, lithium phosphohexafluoride, lithium arsenofluoride and lithium perchlorate.

6. A composite electrolyte for a rechargeable lithium battery as claimed in claim 1, wherein said second lithium compound having dissociable lithium ions dissolved in said organic liquid is selected from the group consisting of lithium triflate, lithium borohexafluoride, lithium phosphohexafluoride, lithium arsenofluoride and lithium perchlorate.

7. A composite electrolyte for a rechargeable lithium battery as claimed in claim 1, wherein said organic liquid is selected from the group consisting of ethyl carbonate, dimethyl carbonate, methyl-ethyl carbonate, propylene carbonate, and mixtures thereof.

8. A composite electrolyte for a rechargeable lithium battery as claimed in claim 1, wherein said composite polymer structure is formed of three layers, and wherein the third layer is another adherent, porous, solid layer of said second polymer deposited on the other of said major faces of said porous, inert first laminate layer of said first polymer.

9. A composite electrolyte for a rechargeable lithium battery as claimed in claim 1, wherein said first lithium compound having dissociable lithium ions is the same as said second lithium compound.

10. A composite electrolyte for a rechargeable lithium battery as claimed in claim 1, wherein said first lithium compound having dissociable lithium ions is different from said second lithium compound.

11. A composite electrolyte for a rechargeable lithium battery as claimed in claim 1, wherein said adherent, porous, solid, second layer of said second polymer is deposited on at least one of the major faces of said porous, inert first laminate layer of said first polymer by one of the methods selected from the group consisting of: electrophoresis; vapor deposition coating of a suspension of said second polymer, and immersion of said inert first polymer; and immersion of said inert first polymer laminate layer in an emulsion of said second polymer.

12. A rechargeable lithium battery comprising:
    a positive electrode;
    a negative electrode; and
    a composite electrolyte comprising an inert first laminate layer of a first polymer, having a multiplicity of pores with walls and two major faces, and having an adherent, porous, solid, second layer of a second polymer deposited on at least one of said major faces, said adherent, porous, solid, second polymer layer containing a first lithium compound having dissociable lithium ions, wherein said adherent, porous, solid, second layer partially fills one portion of said multiplicity of pores of said inert first laminate layer, thereby providing a composite polymer structure of at least two polymer layers having a second portion of said pores unfilled, and wherein said unfilled second portion of said pores of said composite polymer structure is impregnated with an organic liquid containing a second lithium compound having dissociable lithium ions.

13. A rechargeable lithium battery as claimed in claim 12, wherein said composite polymer structure is formed of three layers, and wherein said third layer is another adherent, porous, solid polymer layer of said second polymer deposited on the other of said major faces of said porous, inert first laminate layer of said first polymer.

* * * * *